(12) United States Patent
Chaperon et al.

(10) Patent No.: US 12,438,356 B2
(45) Date of Patent: Oct. 7, 2025

(54) DEVICES FOR MONITORING AND PROTECTING POWER CIRCUITS

(71) Applicant: SAFRAN ELECTRICAL & POWER, Blagnac (FR)

(72) Inventors: Vincent Chaperon, Blagnac (FR); Damien Elmaalouf, Blagnac (FR)

(73) Assignee: SAFRAN ELECTRICAL & POWER, Blagnac (FR)

( * ) Notice: Subject to any disclaimer, the term of this patent is extended or adjusted under 35 U.S.C. 154(b) by 233 days.

(21) Appl. No.: 18/036,071

(22) PCT Filed: Nov. 5, 2021

(86) PCT No.: PCT/FR2021/051955
§ 371 (c)(1),
(2) Date: May 9, 2023

(87) PCT Pub. No.: WO2022/096836
PCT Pub. Date: May 12, 2022

(65) Prior Publication Data
US 2023/0411952 A1 Dec. 21, 2023

(30) Foreign Application Priority Data
Nov. 9, 2020 (FR) ...................................... 2011493

(51) Int. Cl.
*H02H 3/347* (2006.01)
*H02H 3/33* (2006.01)

(52) U.S. Cl.
CPC ............ *H02H 3/347* (2013.01); *H02H 3/335* (2013.01)

(58) Field of Classification Search
CPC ........... H02H 3/307; H02H 1/046; H02H 3/17
See application file for complete search history.

(56) References Cited

U.S. PATENT DOCUMENTS 3,525,019 A    8/1970   Lansch
4,105,965 A *   8/1978   Russell .................. H02H 3/044
                                                  324/424

(Continued)

FOREIGN PATENT DOCUMENTS

| CN | 109672431 A | 4/2019 | |
|---|---|---|---|
| EP | 0776479 B1 * | 10/2002 | ............. G01R 27/18 |
| EP | 2211437 A2 | 7/2010 | |

OTHER PUBLICATIONS

International Patent Application No. PCT/FR2021/051955 International Search Report dated Feb. 24, 2022, 6 pages.

*Primary Examiner* — Peter M Novak
(74) *Attorney, Agent, or Firm* — Cozen O'Connor

(57) ABSTRACT

A device for monitoring and protecting equipment powered by at least one solid-state power controller (SSPC) including at least one current measurement circuit having a current measuring transformer receiving at a primary at least three phases of a three-phase power supply of the equipment, a measuring and testing module including a controller for measuring a current at a secondary $I_m$, representative of a differential current $I_d$ at the primary, and a channel for injecting current into said transformer, the channel having a current $I_{inj}$ generator controlled by an output of the controller and connected to an injection winding on the transformer, the injection winding including a number of turns $N_{in}$ so that the current $I_{inj}$ produces in said measurement windings a test current $I_m$ of said secondary in the absence of current at the primary.

10 Claims, 2 Drawing Sheets

(56) References Cited

U.S. PATENT DOCUMENTS

| | | | | |
|---|---|---|---|---|
| 5,751,524 A | * | 5/1998 | Swindler | H02H 7/22 |
| | | | | 361/115 |
| 2010/0014198 A1 | * | 1/2010 | Dusang, Jr. | H02H 3/165 |
| | | | | 361/47 |
| 2019/0190247 A1 | | 6/2019 | Bernard et al. | |
| 2019/0341213 A1 | | 11/2019 | Kouroussis et al. | |

* cited by examiner

DEVICES FOR MONITORING AND PROTECTING POWER CIRCUITS

CROSS-REFERENCE TO RELATED APPLICATIONS

This application is a US National phase Application of International Patent Application No. PCT/FR2021/051955 filed Nov. 5, 2021, which claims priority to FR No. 2011493 filed Nov. 9, 2020, titled "DEVICES FOR MONITORING AND PROTECTING POWER CIRCUITS" both of which are hereby incorporated in their entireties.

TECHNICAL FIELD

The present invention relates to the field of devices for monitoring and protecting power circuits controlled by switches with solid-state power controllers or semiconductors (solid-state power controller in English), hereinafter called SSPC and in particular the protection against current leakage faults known by the acronym GFI standing for Ground Fault Interrupt in English and by the acronym GFIC Ground Fault Current Interruption.

PRIOR ART

It is known to make three-phase devices for which each power phase crosses a solid-state power controller provided with a switch to interrupt or allow said phase to pass to a device to be powered and to cause each of said power phases crossing a current detection transformer to pass through, the device including a ground fault circuit receiving an output of the current detection transformer, said ground fault circuit comprising an output connected to a monitoring module provided with a controller or digital processor, one or more output(s) of which may be used to send to the controller(s) an order for switching off the power switches in the event of detection of a fault.

Technical Problem

These known solutions allow detecting a leakage of a phase or an insulation fault but do not provide for distinguishing between several levels of earth leakage currents. Moreover, it is desirable to be able to verify the proper operation of the measurement circuit at the current detection transformer to guarantee a proper detection, in particular in the case where individuals might be in contact with the devices controlled by the SSPCs.

DISCLOSURE OF THE INVENTION

In view of the prior art, the present application provides an improved protection device including a means for testing at least one leakage current measurement channel.

More specifically, the present invention relates to a device for monitoring and protecting equipment powered by at least one solid-state power controller called SSPC, said device including at least one current measurement circuit including:
  a current measuring transformer receiving at the primary at least the three phases of a three-phase power supply of the equipment or the phase and the neutral of a single-phase power supply of the equipment and provided at the secondary with at least one winding for measuring the current at the primary;
  a measuring and testing module including a measuring and testing controller provided with at least one analog input connected to said measurement winding by a measurement channel for measuring a current at the secondary in, representative of a differential current $I_d$ at the primary and provided with a measurement program and a digital channel for communication with said SSPC for controlling a switch of said SSPC in the event that said current $I_d$ exceeds a given threshold;
  such that said module includes a channel for injecting current into said transformer, said channel comprising a current $I_{inj}$ generator controlled by an output of the controller and connected to an injection winding on said transformer, said injection winding including a number of turns $N_{inj}$ adapted so that the current $I_{inj}$ produces in said measurement winding a test current $I_m$ of said secondary in the absence of current at the primary and said module includes a test program adapted to control a current injection in parallel with a current measurement.

The injection channel of the invention allows testing the proper operation of the measurement channel(s) of the device, in particular during a self-test of the solid-state power controller.

The features hereinafter correspond to embodiments that could be implemented optionally independently or in combination as the case may be.

According to an advantageous embodiment, the device includes two measurement windings at the secondary, a first measurement winding being adapted for a measurement of a leakage current at the primary in a range 0 to 100 milliamps, a second measurement winding being adapted for a measurement of a leakage current at the primary in a range of 0 to 2 amps.

In a first embodiment suited for a low-level measurement on a three-phase power supply, the device includes three SSPC modules, the transformer is designed to receive the three phases of a three-phase power supply derived from said three SSPC modules and the neutral of the equipment, said current at the primary $I_d$ is the vector sum of the currents of said three phases and of the neutral and said controller is programmed to proceed with one or more current measurement(s) by means of the first measurement winding and order the switching off of the switches of said three SSPC modules on detection of a current $I_{dB}$ at the primary representative of a threshold called low-level GFI threshold in the range of 20 milliamps to 40 milliamps.

In a second embodiment suited for a low-level measurement on a modified three-phase power supply, the device includes three SSPC modules, the transformer is designed to receive the three phases derived from said three SSPC modules and the neutral of a three-phase power supply of the equipment, said primary current Id is the vector sum of the currents of said three phases and of the neutral, said controller is programmed to proceed with a serial connection of said first measurement winding and second measurement winding, carry out one or more current measurement(s) by means of the first winding and the second winding in series and order the switching off of the switches of said three SSPC modules on detection of a current $I_{dB}$ at the primary representative of a threshold called low-level GFI threshold in the range of 20 milliamps to 40 milliamps.

In a third embodiment suited for a high-level measurement on a three-phase power supply, the device includes three SSPC modules, the transformer is designed to receive the three phases of a three-phase power supply of the equipment derived from said three SSPC modules with or without the neutral, said primary current Id is the vector sum of the currents of said three phases and wherein said controller is programmed to proceed with one or more current measurement(s) by means of the second measurement winding and order the switching off of the switches of said three SSPC modules on detection of a current $I_{dH}$ at the primary higher than a so-called high-level GFI threshold in the range of 1 amp to 2 amps.

In a fourth embodiment suited for a low-level or high-level measurement on a single-phase power supply, the device includes an SSPC module, the transformer is designed to receive the phase and the neutral of a single-phase power supply of the equipment, said current at the primary $I_d$ is the difference between the phase current and the neutral current and wherein said controller is either programmed to proceed with one or more current measurement(s) by means of the first measurement winding and order the switching off of the switches of the SSPC on detection of a current $I_{dB}$ at the primary representative of a so-called low-level GFI threshold in the range of 20 milliamps to 40 milliamps.

In a fifth embodiment the device includes an SSPC module, the transformer is designed to receive the phase of a single-phase power supply of the equipment, and said controller is programmed to proceed with one or more current measurement(s) by means of the second measurement winding, or of the first and second winding(s) connected in series, and order the switching off of the switch of the SSPC module on detection of a current Ian at the primary higher than a so-called high-level GFI threshold in the range of 1 amp to 2 amps.

Advantageously, to obtain an easy current detection with a low-level injected current, the current generator may be configured to inject an alternating current with a frequency of ten to fifty times higher than the frequency of the current controlled by the SSPC(s).

The invention further relates to a method for measuring current by means of a device of the invention which includes a self-test sequence for which at least one injection of current representative of one or more given primary current threshold(s) on said injection winding and at least one measurement of the currents at the measurement winding(s) is carried out and in that the measuring and testing module emits an order for switching off the switches of the SSPC module(s) in the event of non-detection of a measurement current on said measurement winding(s).

The method may include, after the self-test sequence, successive current measurement sequences and the emission by the measuring and testing module of an order for switching off the switches of the SSPC modules if the current differential of the 3 phases supplied by the 3 channels of the SSPC modules and the neutral return is higher than a 30 mA threshold during two successive current measurements or if the sum of the currents of the 3 supply phases is non-zero and higher than a defined current level for a defined minimum period.

The method may include, after a self-test sequence, successive current measurement sequences and the emission by the measuring and testing module of an order for switching off the switches of the SSPC modules if the current differential between the phase and the neutral is higher than a defined threshold for two successive current measurements or for a defined minimum period.

BRIEF DESCRIPTION OF THE DRAWINGS

Other features, details and advantages of the invention will appear upon reading the detailed description hereinafter of non-limiting embodiments, and upon analysing the appended drawings, wherein.

DESCRIPTION OF THE EMBODIMENTS

The drawings and the description hereinafter contain elements that not only could serve to better understand the present invention, but also contribute to the definition thereof, where appropriate.

Figure 1:
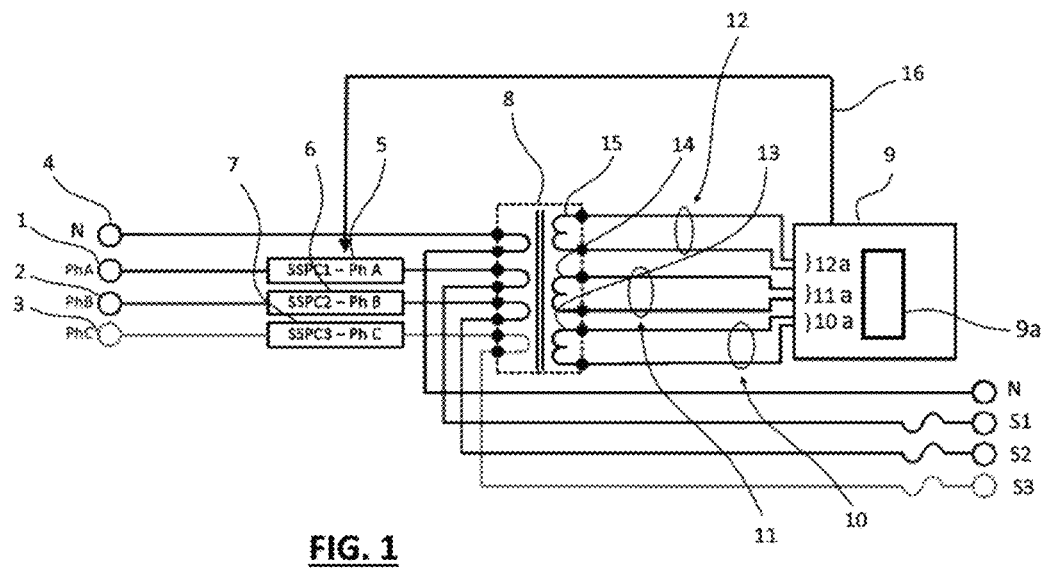
FIG. 1 shows a schematic view of the device object of the description.

Reference is now made to FIG. 1 which represents an electronic device provided with three phase inputs 1, 2, 3 and a neutral input 4, three solid-state power controllers 5, 6, 7 each crossed by one phase, a current detection transformer 8 crossed by the three phases and the neutral to measure the current imbalances between these conductors and carry out a differential current measurement, a measuring and testing module 9 including a microcontroller 9a, voltage measurement channels 10, 11 and a current injection channel 12 each connected to a winding 13, 14, 15 on the transformer 8 and control channels schematised by the link 16 to enable the measuring and testing module to exchange with the SSPC(s) 5, 6, 7.

Figure 3:
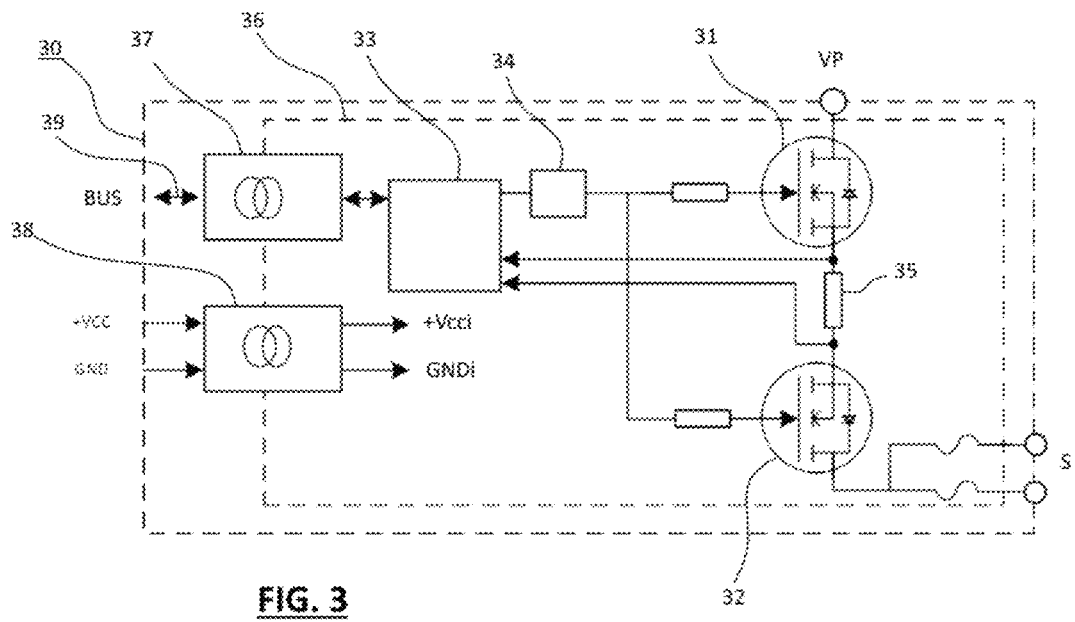
FIG. 3 shows a schematic view of an example of a known type SSPC module.

An example of a known type SSPC 30 module for controlling a phase is schematically represented in FIG. 3. Such a module forms a static electronic circuit breaker driven by a microcontroller 33. This circuit breaker is configurable in order to be able to adapt to different aircraft wiring configurations. In general, the parameters include information such as "Ft protection rating", "default state", "log" and many others.

The static electronic circuit breaker is composed of two MOSFETs (English acronym for insulated-gate field-effect transistor) head-to-tail 31, 32 in alternating current but may include one single MOSFET in the case of a direct current SSPC for the power switch portion and the microcontroller 33 to control and monitor the evolution of the power supply current passing through the SSPC from the input VP to the output S in accordance with the received configuration parameters. Several protection functions ($I^2T$, Thermal memory function) may be managed in parallel by the microcontroller through an acquisition of the current passing through the SSPC performed via a measurement shunt 35.

In the event of a detected fault, the microcontroller 33 sends a cut-off order to the control component 34 responsible for driving the gate of the power MOSFETS. The SSPS includes an internal portion 36 galvanically isolated by isolation means 37, 38 with respect to a network bus 39 of the aircraft 39 and an external power supply for the microcontroller. The power input VP comes out of the SSPC after having crossed the MOSFETs.

In the case of a three-phase application, three single-phase SSPC channels may be grouped together to form one single three-phase SSPC channel capable of driving three-phase loads. In this case, one upstream controller and three channel controllers will be used.

The invention could also be applied to a single-phase switch.

In the context of the invention, it is necessary to provide for two kinds of protection depending on the type of equipment to be controlled.

A first protection is a very sensitive protection ensuring an interruption of the power supply circuit in the event of earth leakage. This protection, hereinafter low-level GFI (GFI being the acronym in English for Ground Fault Interrupt), is carried out by a differential protection of a programmable value generally set at 30 mA using the neutral return to be able to compare the vector sum of the current of the 3 outgoing phases and that of the neutral return. This consists of a people protection, for example in the event of an insulation fault on a device.

A second protection is a less sensitive so-called high-level GFI protection, for example for hydraulic pump type loads, for which the vector sum of the currents of the 3 phases and therefore the leakage current of either one of the phases should not exceed a programmable threshold generally around 0. This protection is a protection in the event of an earth fault on one phase of the device.

These two types of protection allow covering applications using an electrified function or device in an aircraft in contact with a human being. They could be generalised to any other vehicle including electrical or electronic passenger, entertainment or kitchen equipment, for example.

The present description relates to a monitoring and protection device adapted to ensure either protection type depending on its programming and its wiring.

Figure 2A:
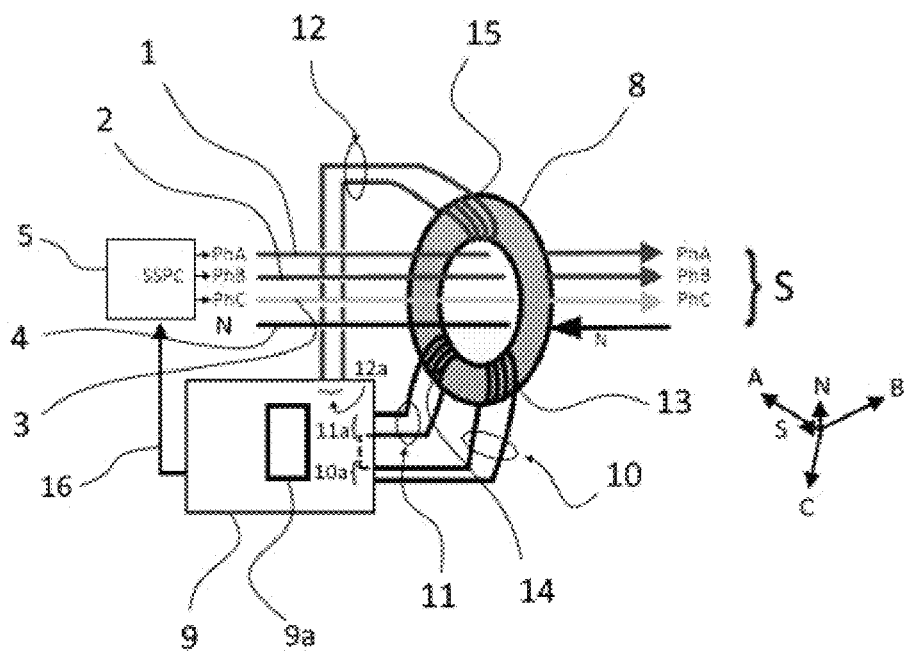
FIG. 2A shows a first embodiment.

According to FIG. 2A, the device is adapted to carry out a measurement of the vector sum of the currents of the 3 phases coming from the SSPC(s) 5 and from the neutral return 4 to ensure the 30 mA differential protection (low-level GFI). This measurement is ensured in the example by means of secondary windings 13, 14 connected to measurement channels 10, 11 of a measuring and testing module 9 such as a microcontroller module 9a provided with analog measurement inputs 10a, 11a. The current transformer 8 receives the power conductors 1, 2, 3 and the neutral conductor 4 of the three-phase load powered throughout the SSPC. In order not to increase the impedance at the primary, these conductors can make only one loop on the toroidal ferrite of the transformer or cross it. The number of turns of the secondary windings is determined to obtain an output voltage offering a level of measurement accuracy on a scale around 30 mA, for example a 0 mA-100 mA scale and to supply a very low impedance brought back to the primary.

In such case the current measured is the magnitude of the vector sum of the three phase currents and the neutral current.

Figure 2B:
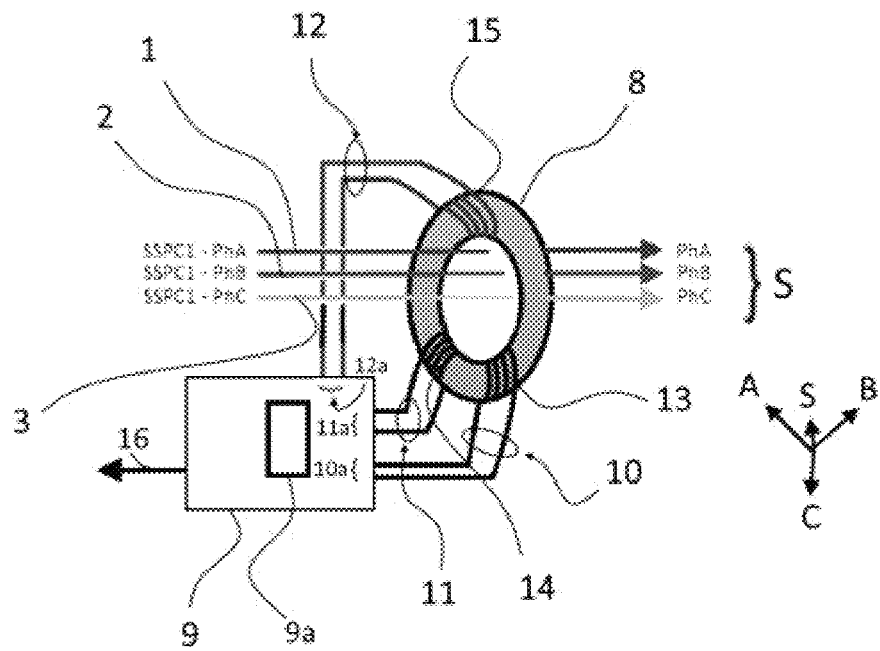
FIG. 2B shows a second embodiment.

The choice to use two secondary windings is to enable the use of the same transformer and the same assembly for the high-level GFI protection (current of 1.5 A). For this protection, it is necessary to measure the vector sum of the currents of the 3 phases. In this case, the neutral return could be not wired to the current transformer as represented in FIG. 2B. This measurement is then carried out by means of only one of the secondary windings 13 or 14 at one of the measurement channels 10 or 11 and the corresponding analog input 10a or 11a of the measuring and testing module 9. The current transformer 8 is only crossed by the power conductors 1, 2, 3 supplying the three-phase load supplied throughout the SSPC. The number of turns of the considered secondary winding is determined so as to obtain an output voltage offering a sufficient level of measurement accuracy to avoid an inadvertent triggering of the protection. In such case the current measured is the magnitude of the vector sum of the three phase currents only.

To clarify the ideas, considering that the power conductors are wound on one single turn for each phase and for the neutral, on the ferrite of the toroidal transformer 8 to limit the impedance of the transformer at the primary, a first secondary winding with N1 turns allows measuring a current range around 1.5 A. Advantageously, this winding connected in series with a second secondary winding with N2 turns allows measuring a current range around 30 mA. The serial connection of the two windings allows having a lower transformation ratio. Moreover, the output shunt changes depending on whether one winding or two is/are used.

According to an aspect of the present description, a means for testing these protection functions to ensure a self-test upon start-up of the SSPC board is made.

For this purpose, the invention suggests using a channel 12 for injecting a current Iinj into the current transformer 8. This injection channel is adapted to generate on the measurement load at the secondary at the measurement channels 10, 11 a current in the secondary windings providing a test value. It should be noted that the test value is independent of the current measurement because the test is done at a frequency different from the frequency of the power supply current of the equipment. For this purpose, the injection channel uses an output channel of the measuring and testing module 9, which will drive a current generator or an oscillator supplying a current and a current injection winding on the current transformer. This winding includes a number of turns Ninj adapted to output the current equivalent to that generated during the fault to be detected.

To generate the test current, it is for example possible to use the microcontroller to drive a mosfet connected to a pull-up resistor or to make an amplifier oscillate to generate a current source. Moreover, by using a high-frequency current, for example 10 to 50 times the frequency of the power supply current of the equipment and a high number of turns, the transformation ratio being very different from the primary secondary ratio, the cut-off frequency of the transformer is not the same as between the primary and the secondary, which allows using a low current.

The low-intensity injected current is injected by a signal generated at a high frequency so as not to overload the output of the microcontroller generating the signal.

For example, for a current transformer operating with a frequency at the primary in the range of 400 Hz to 800 Hz, the frequency of the injected current will be in the range of 8 kHz to 20 kHz and typically 10 kHz. During the current injection which may be carried out when the power circuit is switched off by the SSPC or in an open power circuit self-test sequence, the measuring and testing module 9 verifies the current levels present on the measurement channels 10 and 11 to confirm the proper operation.

To communicate with the SSPC(s), the measuring and testing module includes a bidirectional link 16 through which it can receive a test request or transmit the results of a complete test as well as transmit an order for switching off the power circuit in the event of detection of a fault. In the case where the test confirms the proper operation of the measurement circuit, the measuring and testing module authorises the SSPC(s) to close the power circuit and, in other cases, the measuring and testing module orders the SSPC to open this circuit.

It should be noted that the test cannot be done during the operation phase.

For example, the measurement may include:
In the case where no neutral return is used and if the sum of the currents of the 3 power supply phases is not zero and higher than a defined current level for a defined minimum time in the range of 5 ms to 20 ms then the board interface function could open the 3 SSPC channels to ensure the high-level GFI protection.
In the case where a neutral return is used, the board interface function will ensure the low-level GFI protection by verifying whether the current differential in the 3 phases supplied by the 3 SSPC channels and the neutral return is higher than a 30 mA threshold for two successive current measurements with a step dependent on the application and function of the sampling frequency of the microcontroller.

According to a board start-up test (Power Up Built In Test according to the English terminology), the board interface function proceeds with the injection of current into a secondary of the current transformer to test the current readings of the two high-level and low-level GFI protections.

In each case, a current value taking into account the shunt resistance at the output of the transformer to be controlled is injected by a current source at a higher frequency, in order to proceed with a new reading of the protection winding. This source is driven by the microcontroller of the protection function and not by the SSPC channels.

The invention is not limited to the examples described hereinbefore, only as examples, but it encompasses all variants that a person skilled in the art might consider within the scope of the pursued protection. In particular, the threshold currents might be different just as the measurement channels might be completely separate.

The invention claimed is:

1. A device for monitoring and protecting equipment powered by at least one solid-state power controller called SSPC, said device including at least one current measurement circuit comprising:
    a current measuring transformer comprising a primary through which at least three phases of a three-phase power supply of the equipment or at least the phase of a single-phase power supply of the equipment pass and provided at a secondary with at least two measurement windings for measuring the current at the primary,
    a measuring and testing module including a measuring and testing controller provided with at least one analog input connected to at least one of said measurement windings by a measurement channel for measuring a current at the secondary, representative of a differential current Id at the primary and provided with a measurement program and a digital channel for communication with said SSPC for controlling a switch of said SSPC in the event that said current Id exceeds a given threshold;
    wherein said module includes a channel for injecting current into said transformer, said channel comprising a current $I_{inj}$ generator controlled by an output of the measuring and testing controller and connected to an injection winding on said transformer, said injection winding including a number of turns $N_{inj}$ adapted so that the current $I_{inj}$ produces in said measurement windings a test current $I_m$ of said secondary in the absence of current at the primary and said module includes a test program adapted to control a current injection in parallel with a current measurement;
    and wherein said at least two measurement windings at the secondary are such that a first measurement winding is adapted for a measurement of a leakage current at the primary in a range 0 to 100 milliamps and a second measurement winding is adapted for a measurement of a leakage current at the primary in a range of 0 to 2 amps.

2. The device according to claim 1, wherein the device includes three SSPC modules, the transformer receiving the three phases of a three-phase power supply derived from said three SSPC modules and the neutral of the equipment, said current at the primary $I_d$ is a vector sum amplitude of the currents of said three phases and of the neutral and wherein said controller is programmed to proceed with one or more current measurement(s) by means of the first measurement winding and order the switching off of the switches of said three SSPC modules on detection of a current $I_{dB}$ at the primary representative of a threshold called low-level GFI threshold in the range of 20 milliamps to 40 milliamps.

3. The device according to claim 1, wherein the device includes three SSPC modules, the transformer is designed to receive the three phases derived from said three SSPC modules and the neutral of a three-phase power supply of the equipment, said primary current Id being the vector sum amplitude of the currents of said three phases and of the neutral, said controller is programmed to proceed with a serial connection of said first measurement winding and second measurement winding, carry out one or more current measurement(s) by means of the first measurement winding and the second measurement winding in series and order the switching off of the switches of said three SSPC modules on detection of a current $I_{dB}$ at the primary representative of a threshold called low-level GFI threshold in the range of 20 milliamps to 40 milliamps.

4. The device according to claim 1, wherein the device includes three SSPC modules, the transformer is designed to receive the three phases of a three-phase power supply of the equipment derived from said three SSPC modules without the neutral, said primary current Id is the vector sum amplitude of the currents of said three phases and wherein said controller is programmed to proceed with one or more current measurement(s) by means of the second measurement winding and order the switching off of the switches of said three SSPC modules on detection of a current $I_{dH}$ at the primary higher than a so-called high-level GFI threshold in the range of 1 amp to 2 amps.

5. The device according to claim 1, wherein the device includes an SSPC module, the transformer is designed to receive the phase and the neutral of a single-phase power supply of the equipment, wherein said current at the primary Id is the difference between the phase current and the neutral current and wherein said controller is either programmed to proceed with one or more current measurement(s) by means of the first measurement winding and order the switching off of the switches of the SSPC on detection of a current $I_{dB}$ at the primary representative of a so-called low-level GFI threshold in the range of 20 milliamps to 40 milliamps.

6. The device according to claim 1, wherein the current generator is configured to inject an alternating current with a frequency of ten to fifty times higher than the frequency of the current controlled by the SSPC(s).

7. A method for measuring current by means of a device for monitoring and protecting equipment powered by at least one solid-state power controller called SSPC, said device including at least one current measurement circuit comprising:
    a current measuring transformer comprising a primary through which at least three phases of a three-phase power supply of the equipment or at least the phase of a single-phase power supply of the equipment pass and provided at a secondary with at least two measurement windings for measuring the current at the primary,
    a measuring and testing module including a measuring and testing controller provided with at least one analog input connected to at least one of said measurement windings by a measurement channel for measuring a current at the secondary, representative of a differential current Id at the primary and provided with a measurement program and a digital channel for communication with said SSPC for controlling a switch of said SSPC in the event that said current Id exceeds a given threshold;

wherein said module includes a channel for injecting current into said transformer, said channel comprising a current $I_{inj}$ generator controlled by an output of the measuring and testing controller and connected to an injection winding on said transformer, said injection winding including a number of turns $N_{inj}$ adapted so that the current $I_{inj}$ produces in said measurement windings a test current $I_m$ of said secondary in the absence of current at the primary and said module includes a test program adapted to control a current injection in parallel with a current measurement;

and wherein said at least two measurement windings at the secondary are such that a first measurement winding is adapted for a measurement of a leakage current at the primary in a range 0 to 100 milliamps and a second measurement winding is adapted for a measurement of a leakage current at the primary in a range of 0 to 2 amps, the method comprising:

a self-test sequence for which at least one injection of current representative of one or more given primary current threshold(s) on said injection winding, for which a measurement of the currents at each of said first measurement winding and second measurement winding is carried out and in that the measuring and testing module emits an order for switching off the switches of the SSPC module(s) in case of non-detection of a measurement current on at least either one of said first measurement winding and second measurement winding during said current injection.

8. The method according to claim 7, further comprising, after the self-test sequence, successive current measurement sequences and the emission by the measuring and testing module of an order for switching off the switches of the SSPC modules if the current differential of the 3 phases supplied by the 3 channels of the SSPC modules and the neutral return is higher than a 30 mA threshold during two successive current measurements or if the sum of the currents of the 3 supply phases is non-zero and higher than a defined current level for a defined minimum period.

9. The method according to claim 7, further comprising, after a self-test sequence, successive current measurement sequences and the emission by the measuring and testing module of an order for switching off the switches of the SSPC modules if the current differential between the phase and the neutral is higher than a defined threshold for two successive current measurements or for a defined minimum period.

10. The device according to claim 1, wherein the device includes an SSPC module, the transformer is designed to receive the phase of a single-phase power supply of the equipment, and wherein said controller is programmed to proceed with one or more current measurement(s) by means of the second measurement winding, or of the first and second measurement winding(s) connected in series, and order the switching off of the switch of the SSPC module on detection of a current $I_{dH}$ at the primary higher than a so-called high-level GFI threshold in the range of 1 amp to 2 amps.

* * * * *